(12) United States Patent
Yeom et al.

(10) Patent No.: US 9,524,031 B2
(45) Date of Patent: Dec. 20, 2016

(54) APPARATUS AND METHOD FOR RECOGNIZING SPATIAL GESTURE

(71) Applicant: CENTER OF HUMAN-CENTERED INTERACTION FOR COEXISTENCE, Seoul (KR)

(72) Inventors: Kiwon Yeom, Gyeonggi-do (KR); Hyejin Han, Seoul (KR); Bumjae You, Seoul (KR)

(73) Assignee: CENTER OF HUMAN-CENTERED INTERACTION FOR COEXISTENCE, Seoul (KR)

(*) Notice: Subject to any disclaimer, the term of this patent is extended or adjusted under 35 U.S.C. 154(b) by 141 days.

(21) Appl. No.: 14/349,063

(22) PCT Filed: Nov. 18, 2013

(86) PCT No.: PCT/KR2013/010469
§ 371 (c)(1),
(2) Date: Apr. 1, 2014

(87) PCT Pub. No.: WO2015/034131
PCT Pub. Date: Mar. 12, 2015

(65) Prior Publication Data
US 2015/0138088 A1    May 21, 2015

(30) Foreign Application Priority Data
Sep. 9, 2013  (KR) .................. 10-2013-0107954

(51) Int. Cl.
*G06F 3/0346* (2013.01)
*G06F 3/01* (2006.01)
*G06K 9/00* (2006.01)

(52) U.S. Cl.
CPC ............. *G06F 3/017* (2013.01); *G06F 3/0346* (2013.01); *G06K 9/00355* (2013.01)

(58) Field of Classification Search
None
See application file for complete search history.

(56) References Cited

U.S. PATENT DOCUMENTS 4,024,500 A * 5/1977 Herbst ............... G06K 9/00865
382/178
5,272,470 A * 12/1993 Zetts ................... G06F 3/04883
178/19.01

(Continued)

FOREIGN PATENT DOCUMENTS

JP   H05-298490    11/1993
JP   5167523      3/2013

(Continued)

*Primary Examiner* — Antonio Xavier
(74) *Attorney, Agent, or Firm* — Wells St. John P.S.

(57) ABSTRACT

The present invention relates to an apparatus for recognizing a gesture in a space. In accordance with an embodiment, a spatial gesture recognition apparatus includes a pattern formation unit for radiating light onto a surface of an object required to input a gesture in a virtual air bounce, and forming a predetermined pattern on the surface of the object, an image acquisition unit for acquiring a motion image of the object, and a processing unit for recognizing a gesture input by the object based on the pattern formed on the surface of the object using the acquired image. In this way, depending on the depths of an object required to input a gesture in a space, haptic feedbacks having different intensities are provided, and thus a user can precisely input his or her desired gesture.

7 Claims, 11 Drawing Sheets

(56) References Cited

U.S. PATENT DOCUMENTS

| | | | | |
|---|---|---|---|---|
| 5,459,809 A * | 10/1995 | Kim | | G06K 9/00879 382/160 |
| 5,577,135 A * | 11/1996 | Grajski | | G06K 9/6218 382/187 |
| 5,707,160 A * | 1/1998 | Bowen | | B41J 5/10 345/157 |
| 6,018,591 A * | 1/2000 | Hull | | G06K 9/222 382/122 |
| 6,208,756 B1 | 3/2001 | Suzuki | | |
| 2002/0196238 A1* | 12/2002 | Tsukada | | G06F 3/0421 345/173 |
| 2004/0056907 A1* | 3/2004 | Sharma | | G10L 15/24 715/863 |
| 2004/0150631 A1* | 8/2004 | Fleck | | G06F 3/038 345/179 |
| 2006/0244733 A1* | 11/2006 | Geaghan | | G06F 3/041 345/173 |
| 2008/0006762 A1* | 1/2008 | Fadell | | G01J 1/4204 250/201.1 |
| 2008/0170776 A1* | 7/2008 | Albertson | | G06F 21/35 382/154 |
| 2008/0291396 A1* | 11/2008 | Baer | | G01M 11/0221 351/211 |
| 2009/0058829 A1* | 3/2009 | Kim | | G06F 3/0416 345/173 |
| 2009/0189858 A1 | 7/2009 | Lev et al. | | |
| 2009/0189905 A1* | 7/2009 | Cho | | G06F 17/214 345/467 |
| 2009/0289914 A1* | 11/2009 | Cho | | G06F 3/044 345/173 |
| 2009/0327977 A1* | 12/2009 | Bachfischer | | B60K 35/00 715/863 |
| 2010/0002936 A1* | 1/2010 | Khomo | | G06K 9/222 382/187 |
| 2010/0053304 A1* | 3/2010 | Underkoffler | | G06F 3/017 348/42 |
| 2010/0090982 A1* | 4/2010 | Oba | | G06F 3/044 345/174 |
| 2010/0149126 A1* | 6/2010 | Futter | | G06F 1/3231 345/174 |
| 2011/0006991 A1* | 1/2011 | Elias | | G06F 1/1662 345/168 |
| 2011/0093778 A1* | 4/2011 | Kim | | G06F 3/041 715/702 |
| 2011/0228251 A1* | 9/2011 | Yee | | G06T 7/0057 356/5.01 |
| 2012/0236288 A1* | 9/2012 | Stanley | | G06F 3/017 356/4.01 |
| 2012/0242793 A1* | 9/2012 | Im | | G06F 3/011 348/46 |
| 2012/0257020 A1* | 10/2012 | Yee | | G06T 7/0057 348/46 |
| 2013/0002860 A1* | 1/2013 | Yamaguchi | | G01S 17/48 348/135 |
| 2013/0181897 A1 | 7/2013 | Izumi | | |
| 2013/0342501 A1* | 12/2013 | Molne | | G06F 3/0416 345/174 |

FOREIGN PATENT DOCUMENTS

| | | |
|---|---|---|
| KR | 10-2011-0000908 | 11/1993 |
| KR | 10-2012-0101520 | 9/2012 |

* cited by examiner

APPARATUS AND METHOD FOR RECOGNIZING SPATIAL GESTURE

CROSS REFERENCE TO RELATED APPLICATION

This is a 35 U.S.C. §371 application of, and claims priority to, International Application No. PCT/KR2013/010469, which was filed on Nov. 18, 2013, which claims priority to Korean Patent Application No. KR 10-2013-0107954, which was filed on Sep. 9, 2013, the entirety of all the applications are incorporated herein by reference.

TECHNICAL FIELD

The present invention relates, in general, to an apparatus and method for recognizing a gesture in a space and, more particularly, technology enabling various interactions to be performed by recognizing the hand gestures of a user made in a space.

BACKGROUND ART

Recently, technologies for performing various interactions via the recognition of the gesture of a user, for example, technologies for analyzing a gesture input by the user via a terminal, such as a smart phone or a smart television (TV), and executing a predefined function or application, or technologies for inputting game instructions depending on gestures input by a user to various types of game devices, have appeared. Korean Patent Application Publication No. 10-2011-0000908 discloses technology, which recognizes a gesture made by a user in a presentation, generates a feedback signal for stimulating the tactile sensation of the user depending on the motion pattern of the gesture, and provides feedback indicating that a gesture recognition procedure has been accurately performed to the user.

DISCLOSURE

Technical Problem

The present invention is intended to provide an apparatus and method that provide haptic feedback so that a user can exactly input a gesture in a space, and form a pattern on the surface of an object with which an action is made in order for the user to input the gesture, thus enabling the meaning of the gesture to be exactly analyzed based on the pattern.

Technical Solution

In accordance with an aspect, an apparatus for recognizing a spatial gesture includes a pattern formation unit for radiating light onto a surface of an object required to input a gesture in a virtual air bounce, and forming a predetermined pattern on the surface of the object, an image acquisition unit for acquiring a motion image of the object, and a processing unit for recognizing a gesture input by the object based on the pattern formed on the surface of the object using the acquired image.

In this case, the air bounce may include a first area in which a plurality of virtual electrodes are arranged at regular intervals on a plane in a space, and in which a motion of the object is recognized as a gesture, a second area in which an electric field is formed in a forward direction by the plurality of virtual electrodes, and a third area in which the air bounce starts.

The spatial gesture recognition apparatus may further include a haptic provision unit for, if the object enters the air bounce to input a gesture, providing haptic feedbacks having one or more of different intensities and different types to the object in the first area, the second area, and the third area.

The processing unit may include a pattern analysis unit for analyzing the pattern formed on the object and calculating depth information of the object entering the air bounce, and a gesture recognition unit for recognizing a motion of the object made in a predetermined area of the air bounce as a gesture based on the calculated depth information of the object.

The pattern analysis unit may calculate one or more of size information and density information of the pattern formed on the object, and calculate the depth information of the object using the calculated information.

The gesture recognition unit may extract information about one or more feature vectors from the recognized gesture, and eliminates a ligature from the motion of the object using the extracted feature vectors.

The gesture recognition unit may extract one or more segmentation points using the extracted feature vectors and the calculated depth information of the object, and determines a portion for connecting the extracted segmentation points to be a ligature.

The gesture recognition unit may extract the segmentation points by applying the feature vectors and the depth information of the object to any one of feature point extraction techniques including a matching probability technique and a pattern model technique.

In accordance with another aspect, a method of recognizing a spatial gesture, include radiating light onto a surface of an object required to input a gesture in a virtual air bounce, and forming a predetermined pattern on the surface of the object, acquiring a motion image of the object, and recognizing a gesture input by the object based on the pattern formed on the surface of the object using the acquired image.

Recognizing the gesture may include analyzing the pattern formed on the object and calculating depth information of the object entering the air bounce, wherein a motion of the object made in a predetermined area of the air bounce is recognized as a gesture based on the calculated depth information of the object.

Calculating the depth information may be configured to calculate one or more of size information and density information of the pattern formed on the object, and calculate the depth information of the object using the calculated information.

Recognizing the gesture may include extracting information about one or more feature vectors from the motion of the object, and eliminating a ligature from the motion of the object using the extracted feature vectors.

Eliminating the ligature may include extracting one or more segmentation points using the extracted feature vectors and the calculated depth information of the object, and determining a portion for connecting the extracted segmentation points to be the ligature.

Extracting the segmentation points may be configured to extract the segmentation points by applying the feature vectors and the depth information of the object to any one of feature point extraction techniques including a matching probability technique and a pattern model technique.

Advantageous Effects

Depending on the depths of an object required to input a gesture in a space, haptic feedbacks having different intensities are provided, and thus a user can precisely input his or her desired gesture.

Further, a predetermined pattern is formed on an object required to input a gesture, and the gesture is recognized using the pattern, thus enabling the meaning of the gesture input by the user to be exactly analyzed.

BEST MODE

Figure 1:
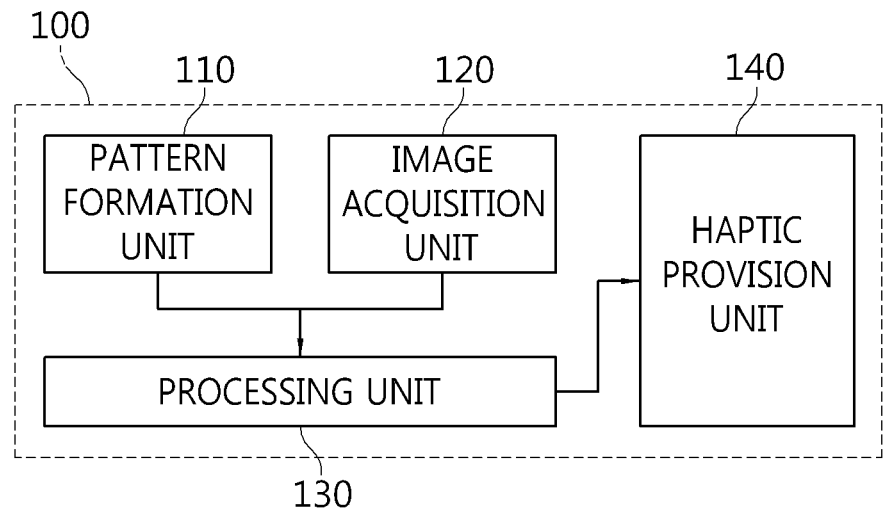
FIG. 1 is a block diagram showing an apparatus for recognizing a spatial gesture according to an embodiment.

Details of other embodiments are included in detailed description and attached drawings. The features and advantages of technology disclosed in the present invention and methods for achieving them will be more clearly understood from detailed description of the following embodiments taken in conjunction with the accompanying drawings. Reference now should be made to the drawings, in which the same reference numerals are used throughout the different drawings to designate the same or similar components.

Hereinafter, embodiments of an apparatus and method for recognizing a spatial gesture will be described in detail with reference to the attached drawings.

FIG. 1 is a block diagram showing an apparatus for recognizing a spatial gesture according to an embodiment.

Referring to FIG. 1, a spatial gesture recognition apparatus 100 includes a pattern formation unit 110, an image acquisition unit 120, a processing unit 130, and a haptic provision unit 140.

According to an embodiment, the units 110, 120, 130, and 140 of the spatial gesture recognition apparatus 100 may be implemented in different hardware devices, respectively, and two or more units thereof may be integrated into a single hardware device as occasion demands.

The pattern formation unit 110 may form a predetermined pattern by radiating light onto the surface of an object required to input a gesture in an air bounce which is a virtual interface formed in a space. In this case, the object required by the user to input a gesture may be, for example, the user's finger. However, this is only a simple example, and it is apparent that any type of object other than the finger may correspond to the gesture-input object.

Meanwhile, in accordance with an embodiment, the pattern formation unit 110 may form a predetermined pattern on the object by radiating light onto the object via a Light Emitting Diode (LED) light source that is capable of radiating light in a predefined pattern, such as a grid or lattice pattern.

The image acquisition unit 120 is configured to, if the user moves the object so as to input a gesture in the virtual air bounce, acquire a motion image of the object. In this case, the image acquisition unit 120 may acquire the motion image of the object using a camera module enabling motion capture.

The image acquisition unit 120 may additionally perform preprocessing procedures, such as slant correction, deskewing, denoising, thinning, and contour smoothing if the motion image of the object is acquired. Here, the individual preprocessing procedures are well-known technologies in image processing fields, and thus a detailed description thereof will be omitted here.

In addition, the image acquisition unit 120 may acquire images using a depth measurement camera capable of measuring the depth of the object.

The processing unit 130 is configured to, if the motion image of the object is acquired by the image acquisition unit 120, recognize a gesture input by the object based on the pattern formed on the surface of the object. Further, the processing unit 130 is configured to, if the gesture input by the object has been recognized, output the results of the recognition via a display.

The haptic provision unit 140 may provide haptic feedback to the object if the user enters the object in the air bounce in a space so as to input the gesture. In this case, the haptic provision unit 140 may provide haptic feedbacks set to have various types or intensities to the user, and may, for example, be configured in such a way that the user feels vibrations having different intensities depending on the depth to which the user enters the air bounce.

Figure 2:
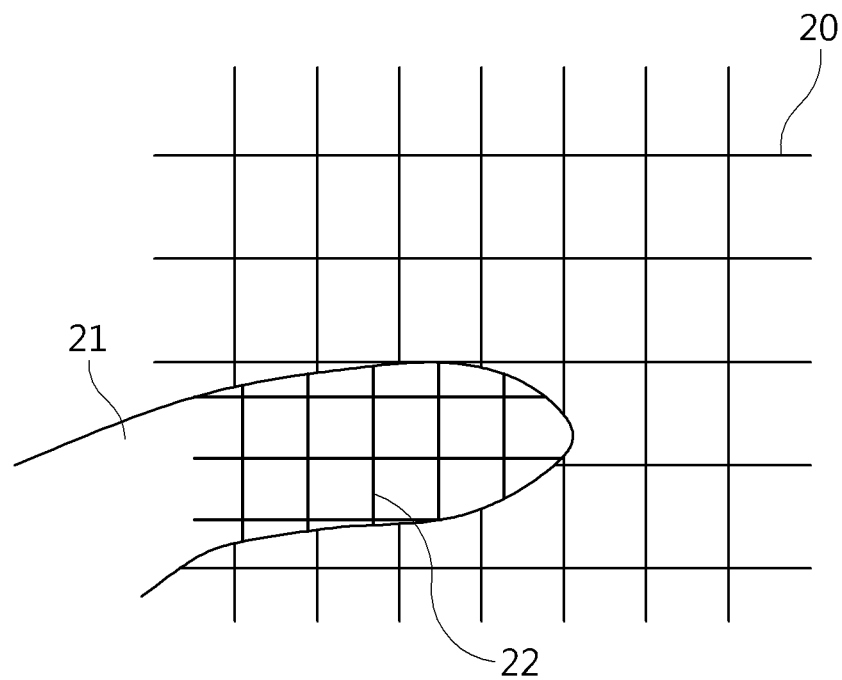
FIG. 2 illustrates an example of a pattern formed on the surface of a gesture-input object.

FIG. 2 illustrates an example of a pattern formed on the surface of a gesture-input object.

Referring to FIG. 2, when the pattern formation unit 110 radiates light onto an object 21 using, for example, an LED light source, a grid pattern 22 may be formed on the surface of the object 21. In this case, the size of the pattern 22 formed on the object 21 may be smaller than that of a pattern 20 formed at any location farther from the pattern formation unit 110 than the object 21. In this way, depending on the distance (on Z axis) from the location of the pattern formation unit 110, that is, the light source, to the object 21, the size of the patterns formed on the object 21, and density, such as the number of patterns, are varied.

Therefore, when the size or density information of the pattern formed on the object 21 is used, the depth of the object 21 that has entered the air bounce to input a gesture may be detected.

Figure 3:
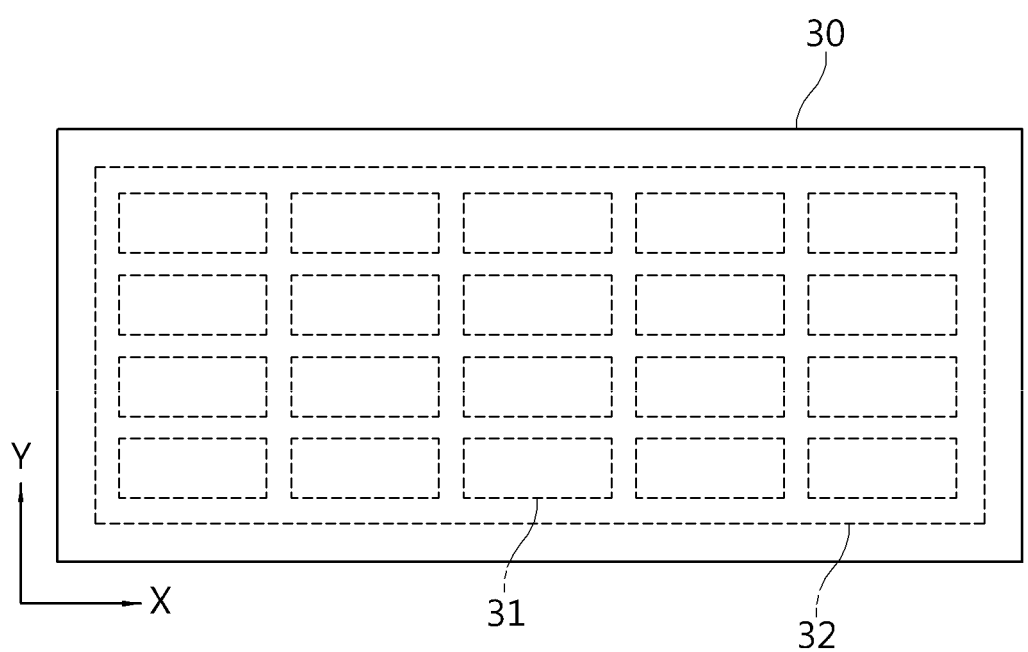
FIGS. 3 and 4 illustrate an example of a virtual air bounce formed in a space.
Figure 4:
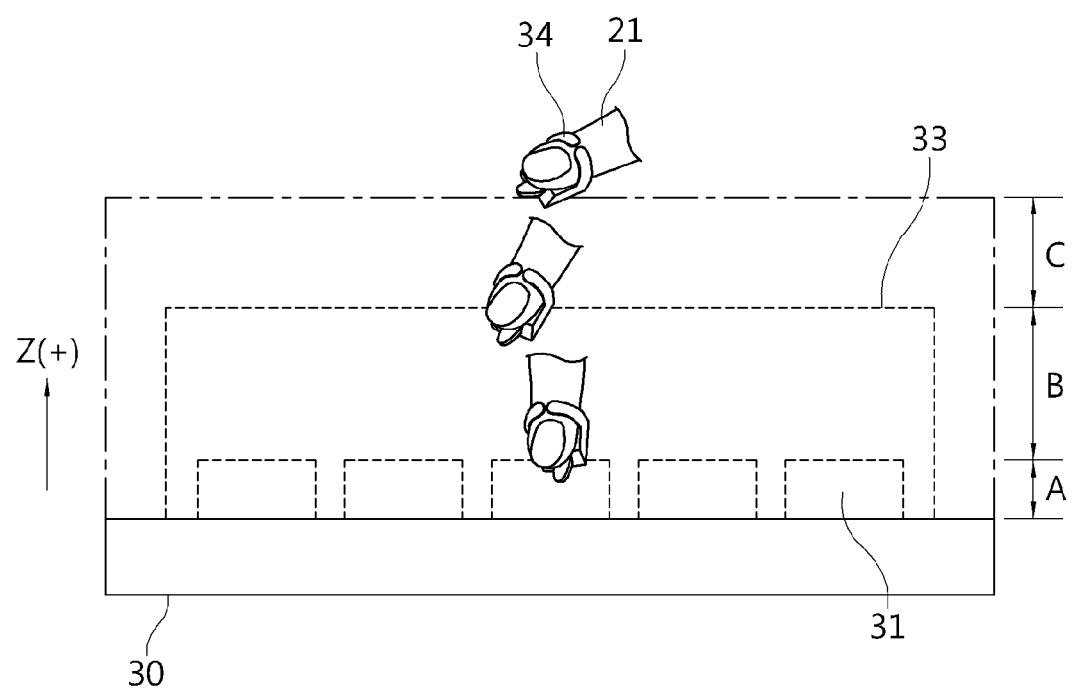

FIGS. 3 and 4 illustrate an example of a virtual air bounce formed in a space.

As shown in FIGS. 3 and 4, the air bounce may be configured such that a plurality of virtual electrodes 31 are arranged at predetermined intervals on an X-Y plane 30, and then an array 32 is formed. Further, a virtual electric field 33 may be formed by the virtual electrodes in the forward direction (Z axis) of the plane 30.

That is, the air bounce may include a first area A in which the plurality of virtual electrodes are arranged and the user actually makes a gesture-input action, a second area B in which an electric field is formed by the virtual electrodes, and a third area C in which the air bounce starts from the location of the user.

The haptic provision unit 140 is configured to, if the user enters the object 21 in the air bounce so as to input a gesture, provide haptic feedbacks having different intensities or types to the user depending on the depths of entry. In accordance with an embodiment, the haptic provision unit 140 may be implemented in the form of a haptic device 34 that can be worn on the gesture-input object 21, as shown in the drawing.

As shown in the drawing, when the user wears the haptic device 34 on the object 21, and enters the object in the third area C, a vibration having low intensity is generated. When the object reaches the second area B, a vibration having medium intensity is generated. Finally, when the object reaches the first area A, a vibration having high intensity is generated, thus allowing the user to feel that he or she has entered the surfaces of the respective areas.

By way of this function, the user may immediately determine which point of the air bounce the object 21 has reached, in particular, whether the object has reached the first area A in which a gesture-input action is made, and whether the gesture-input action has been desirably made in the first area A, and thus the user may exactly input the gesture.

In this case, the plurality of virtual electrodes 31 may be regularly arranged at regular intervals on the X-Y plane 30 in the space. This allows the user to intuitively feel that the action of inputting a gesture is being exactly made.

That is, when the user moves the object 21 in a horizontal direction (X axis) or a vertical direction (Y axis) in the first area A corresponding to the locations of the virtual electrodes 31, vibration feedback having the same intensity is continuously provided to the object 21 while the object 21 is moving, and thus the user may feel as if he or she touches the object 21 to the actual surface rather than the virtual space to input a gesture.

In this way, the user may exactly input successive actions such as writing characters or drawing pictures without discontinuity via the air bounce, which is the virtual interface, and haptic feedbacks provided by the haptic provision unit 140.

Figure 5:
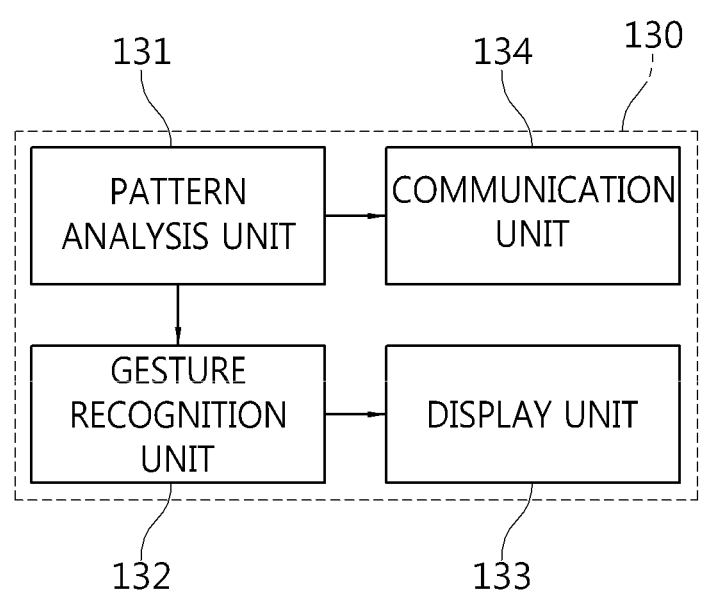
FIG. 5 is a detailed block diagram showing the processing unit of the spatial gesture recognition apparatus of FIG. 1.

FIG. 5 is a detailed block diagram showing the processing unit 130 of the spatial gesture recognition apparatus 100 of FIG. 1. FIGS. 6 to 9 are diagrams illustrating the procedure of recognizing the user's gesture.

The configuration of the processing unit 130 will be described in detail below with reference to FIG. 5. The processing unit 130 may include a pattern analysis unit 131, a gesture recognition unit 132, a display unit 133, and a communication unit 134.

The pattern analysis unit 131 analyzes a pattern formed by the pattern formation unit 110 on an object required to input a gesture. As described above, the pattern analysis unit 131 may calculate the size information and density information of the pattern formed on the object, and may calculate information about the depth to which the object enters the air bounce, using the calculated information.

The gesture recognition unit 132 may recognize, based on the calculated depth information, the motion of the object made in a predefined area of the air bounce, for example, the first area A in which a plurality of virtual electrodes are arranged as described above, as a gesture.

In this case, when the image acquisition unit 120 acquires an image using a camera capable of measuring depth, the depth information of the object measured by the depth measurement camera may be immediately utilized to recognize the gesture.

Figure 6:
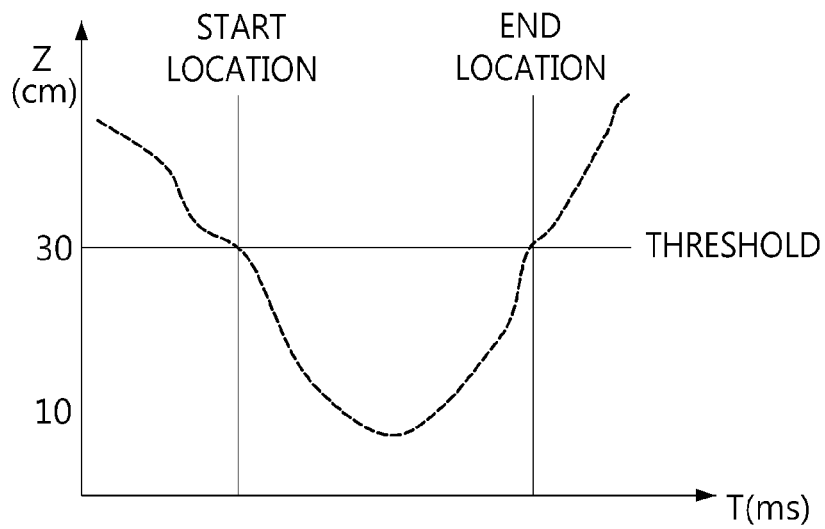
FIGS. 6 to 9 are diagrams illustrating a procedure for recognizing the gesture of a user.

Referring to FIG. 6, a distance on a Z axis denotes the distance from the plane, on which the virtual electrodes of the air bounce are arranged, to the object. Motion made by the object from a location (start location) at which the object enters a predetermined area, that is, an area falling within the range of a preset threshold (for example, within 30 cm) as shown in the drawing, to a location (end location) departing from the range threshold may be recognized as a gesture.

Figure 7:
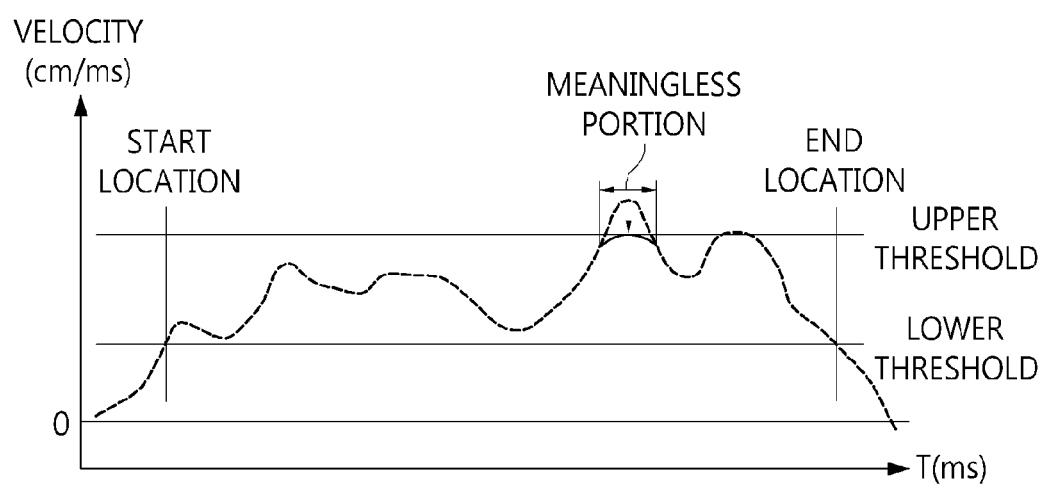
Figure 8:
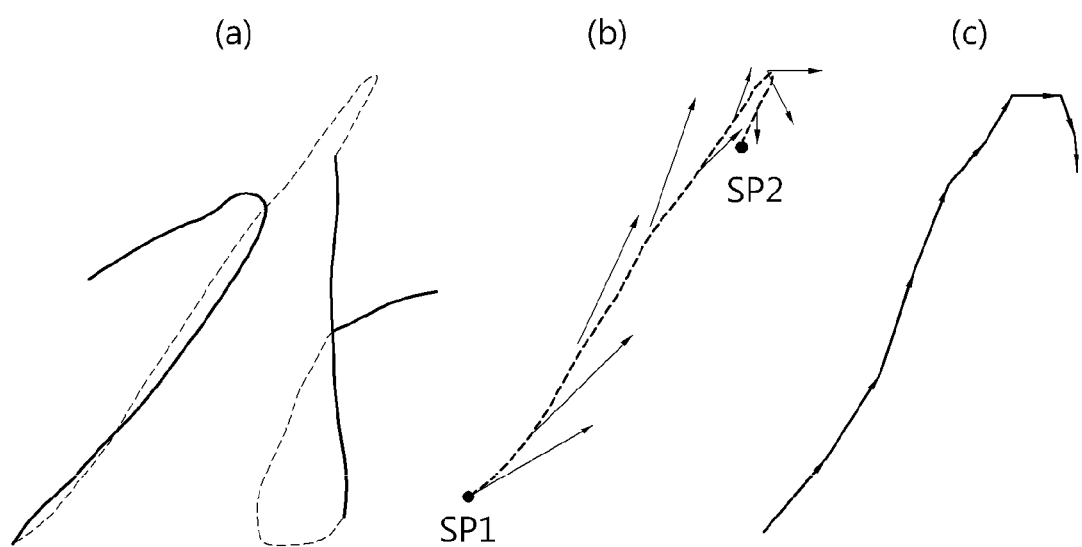
Figure 9:
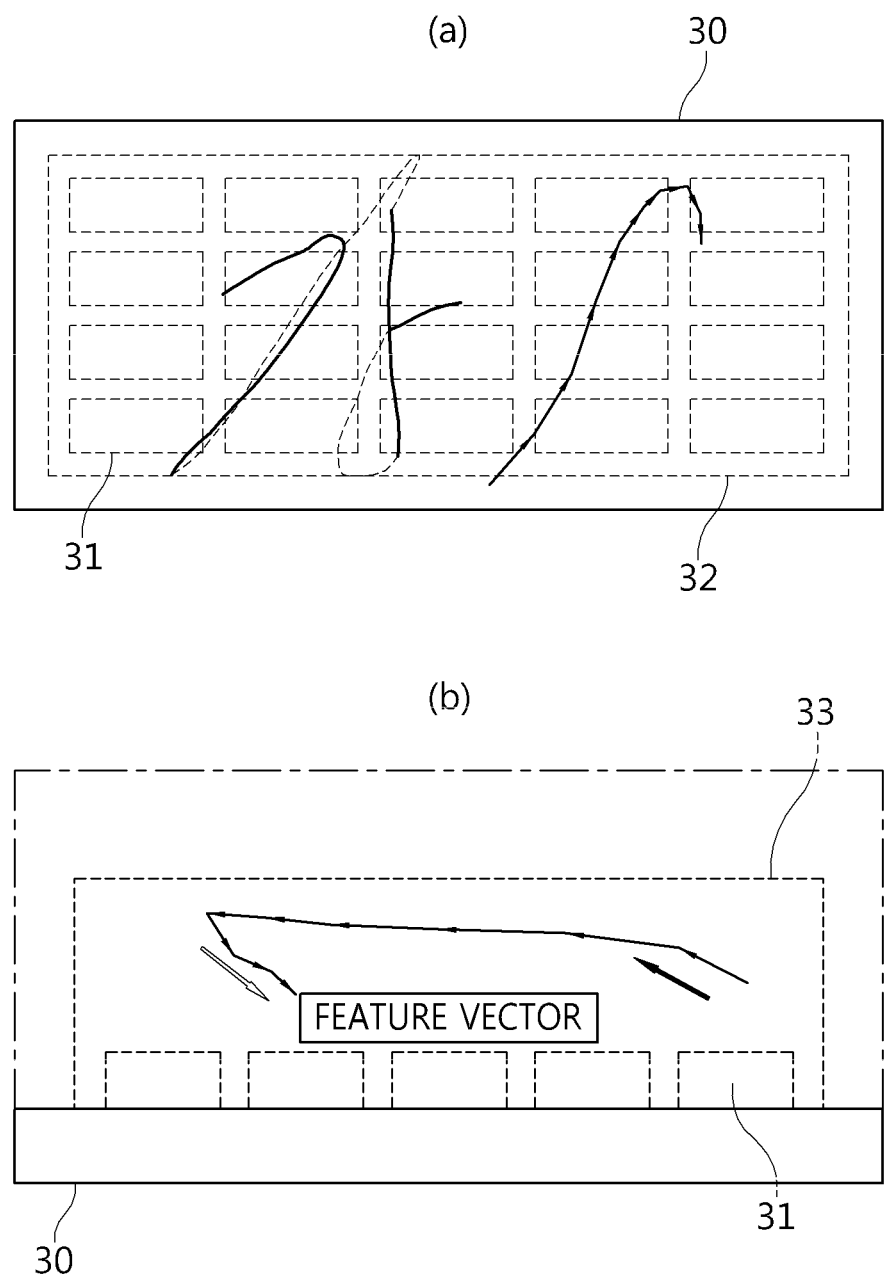

FIGS. 7 to 9 are diagrams showing a procedure in which the gesture recognition unit 132 eliminates a meaningless portion, that is, a ligature, from the gesture input by the user by using feature vectors.

Referring to FIG. 7, the gesture recognition unit 132 recognizes the motion of an object made in a predetermined area as a gesture. In this case, one or more feature vectors including direction and velocity may be extracted from the motion of the object made in the predetermined area. Further, the extracted feature vectors may be used or, alternatively, the velocities of the feature vectors may be differentiated to take the acceleration value of the vectors, and the acceleration value may be used to eliminate or correct a meaningless portion, that is, a ligature, from the motion of the object.

For example, when the user makes a continuous action to write a character or draw a picture, the velocity or direction of the motion frequently changes. In this case, the cause of changes in the velocity or direction may be various in such a way that, for example, the user may change the velocity or direction of the motion so as to make a meaningless action such as promptly moving to make a next meaningful action after intentionally completing a single meaningful action. Alternatively, a meaningless motion may unintentionally occur while the user makes a meaningful motion.

In this way, the upper threshold and lower threshold of the velocity are previously set so that the action made by the user may be more exactly analyzed. If a velocity deviates from the corresponding velocity, the corresponding portion is determined to be a ligature, and this ligature may be eliminated or corrected so that the velocity falls within the range of thresholds.

As shown in FIG. 8, the gesture recognition unit 132 may extract segmentation points required to search for a ligature using the extracted feature vectors and the calculated depth information of the object.

In this case, the gesture recognition unit 132 may extract the segmentation points by applying the feature vectors and the object depth information to one of feature point extract techniques including a matching probability technique and a pattern model technique.

If segmentation points are extracted, the gesture recognition unit 132 may determine a portion for connecting the extracted segmentation points to be a ligature.

FIGS. 8 and 9 illustrate an example in which a user makes the action of inputting the character '가' in the air bounce. FIG. 8(*a*) is a view showing a ligature appearing when the character '가' is input, (b) is a view showing the extraction of segments from the feature vectors of the ligature, and (c) is a view showing an example of the feature vectors of the ligature. Further, FIG. 9(*a*) is a front view of the air bounce, and (b) is a top view showing the air bounce.

Below, although the character '가' has been exemplified for the convenience of description, the present invention is not limited to such an example and may be applied to various actions such as drawing a picture, as well as writing an English letter or a numeral such as 'A' or '4'.

As shown in FIG. 8(a), when users generally input the character '가', they input meaningful letters 'ㄱ' and 'ㅏ' at considerably constant velocities, and when the users make the action of moving from 'ㄱ' to 'ㅏ', as indicted by dotted lines, the action becomes slightly faster. Further, as the user approaches the start location of 'ㅏ', the velocity exhibits a tendency to gradually decrease. Furthermore, in general, when the user moves to input 'ㅏ' after inputting 'ㄱ', the object exhibits a tendency to be slightly removed from the touch surface so that letters are not actually written.

Similarly to this, referring to FIGS. 9(a) and (b), the user inputs 'ㄱ' in a gesture-input area in which virtual electrodes 31 are arranged in the virtual air bounce formed in the space, moves the object in the positive (+) direction of a Z axis, that is, a direction far away from the X-Y plane 30 in the space so as to enter the letter 'ㅏ', and then enters again the object in the gesture-input area and inputs the letter 'ㅏ'.

By using the general tendency of users, features vectors such as those shown in FIG. 8(c) and FIGS. 9(a) and (b) may be extracted. As shown in the drawings, when feature vectors of the action indicating a ligature, that is, pieces of velocity and direction information, are extracted, one or more segmentation points SP1 and SP2 may be determined in consideration of variations in velocity and direction and variations in the calculated object depth, as shown in FIG. 8(b).

Once the segmentation points SP1 and SP2 are determined, a portion of an action between the segmentation points SP1 and SP2 among the actions of the user is determined to be a meaningless motion, that is, a ligature, and is eliminated, thus allowing the gesture input by the user to be exactly recognized.

Meanwhile, when the user inputs characters, the gesture recognition unit 132 may eliminate a meaningless action such as a ligature between meaningful letters in the input letters, and perform character classification. In this case, the gesture recognition unit 132 may perform character classification using a neural network technique or a hidden Markov model technique.

Referring back to FIG. 5, the display unit 133 is configured to, if the gesture recognition unit 132 recognizes the gesture input by the user, such as writing characters or drawing pictures, display the results of the recognition on the display.

The communication unit 134 is configured to, if the pattern analysis unit 131 analyzes a pattern from the acquired motion image of the object and calculates the depth information of the object, transmit the calculated depth information in real time to the haptic provision unit 140 shown in FIG. 1.

Figure 10:
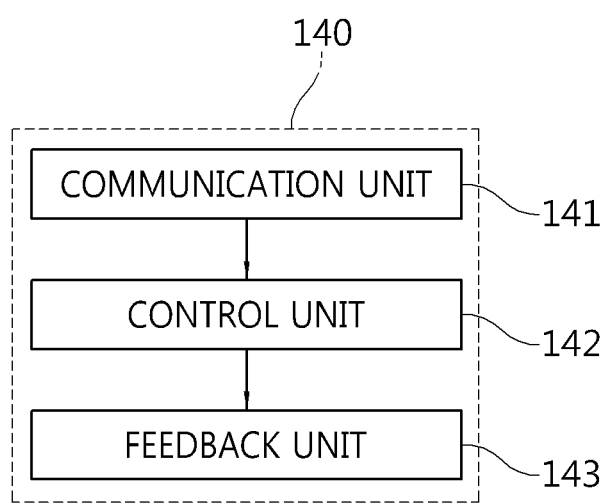
FIG. 10 is a detailed block diagram showing the haptic provision unit of the spatial gesture recognition apparatus of FIG. 1.

FIG. 10 is a detailed block diagram showing the haptic provision unit 140 of the spatial gesture recognition apparatus 100 of FIG. 1.

The haptic provision unit 140 according to an embodiment will be described in greater detail with reference to FIG. 10. The haptic provision unit 140 may include a communication unit 141, a control unit 142, and a feedback unit 143.

The communication unit 141 may receive the depth information of an object in real time from the processing unit 130.

When the communication unit 141 receives the depth information of the object, the control unit 142 determines the depth to which the object enters the air bounce, based on the depth information, and controls the feedback unit 143 so that a vibration having intensity preset in correspondence with the depth may be provided. Further, if it is determined that the object has reached as far as a predetermined area enabling the input of a gesture, that is, an area in which a plurality of virtual electrodes are arranged, in an air bounce area, the control unit 142 controls the feedback unit 143 so that a vibration having higher intensity may be provided.

The feedback unit 143 may produce a vibration having intensity corresponding to a control signal from the control unit 142 in response to the control signal and may transfer the vibration to the object.

Figure 11:
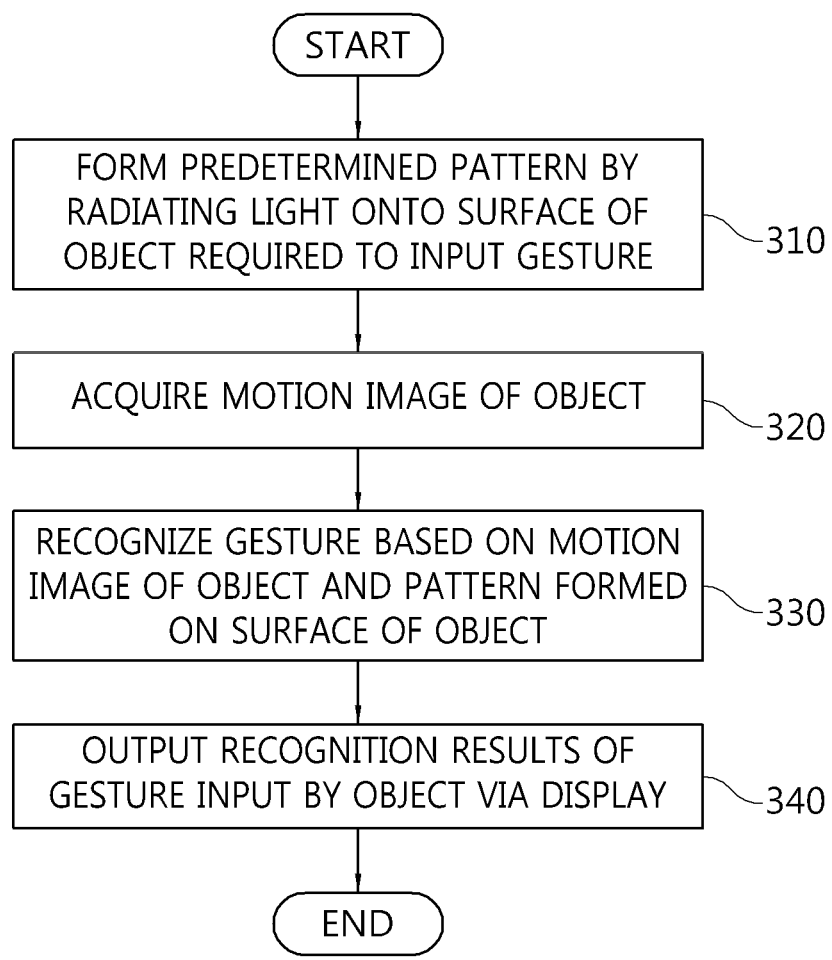
FIG. 11 is a flowchart showing a method of recognizing a spatial gesture according to an embodiment.
Figure 12:
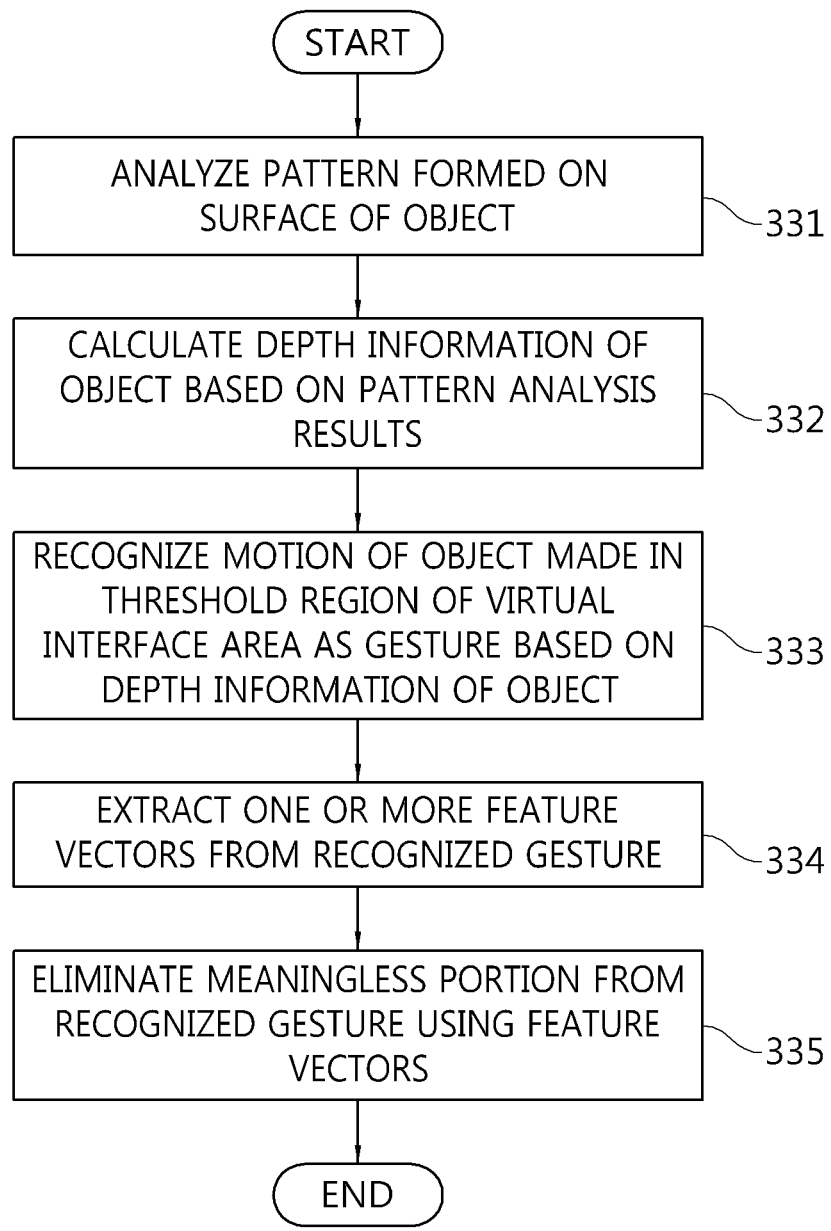
FIG. 12 is a detailed flowchart showing the gesture recognition step of the spatial gesture recognition method of FIG. 11.

FIG. 11 is a flowchart showing a method of recognizing a spatial gesture according to an embodiment, and FIG. 12 is a detailed flowchart showing the gesture recognition step of the spatial gesture recognition method of FIG. 11.

The spatial gesture recognition method of FIG. 11 may be performed by the above-described spatial gesture recognition apparatus 100. Since the gesture recognition method processed by the spatial gesture recognition apparatus 100 has been described in detail with reference to the drawings from FIG. 1, a description will be made in brief to avoid redundant descriptions.

First, when the user makes an action of inputting a gesture using a predetermined object in an air bounce which is a virtual interface area formed in a space, light is radiated onto the object, and a predetermined pattern is formed on the surface of the object (step 310).

Next, the motion image of the object is acquired (step 320).

If the motion image of the object is acquired (step 320), the gesture input by the object is recognized in the acquired motion image of the object, based on the pattern formed on the surface of the object (step 330).

The step 330 of recognizing the gesture input by the object will be described in detail with reference to FIG. 12. The pattern formed on the object is analyzed (step 331), and the depth information of the object entering the air bounce may be calculated based on the results of pattern analysis (step 332). In this case, the size information and density information of the pattern formed on the object are calculated, and the depth information of the object may be calculated using the calculated size and density information of the pattern.

Then, the action of the object in the air bounce is recognized as the gesture input by the user using the calculated depth information of the object (step 333). In this case, only an action made in a predetermined area satisfying preset thresholds in the air bounce, for example, in a first area in which a plurality of virtual electrodes are arranged as described above, may be recognized as the gesture actually input by the user.

Next, one or more feature vectors are extracted from the action made in the predetermined area (step 334), and a meaningless portion, that is, a ligature, may be eliminated from the motion of the object using the feature vectors (step 335).

In this case, segmentation points required to search for a ligature are extracted using the extracted feature vectors and the calculated depth information of the object, and a portion for connecting the segmentation points may be determined to be the ligature. The segmentation points may be extracted by applying the corresponding information to any one of feature point extraction techniques including a matching probability technique and a pattern model technique.

Next, when the gesture is recognized, the results of recognition may be output via the display (step 340).

Figure 13:
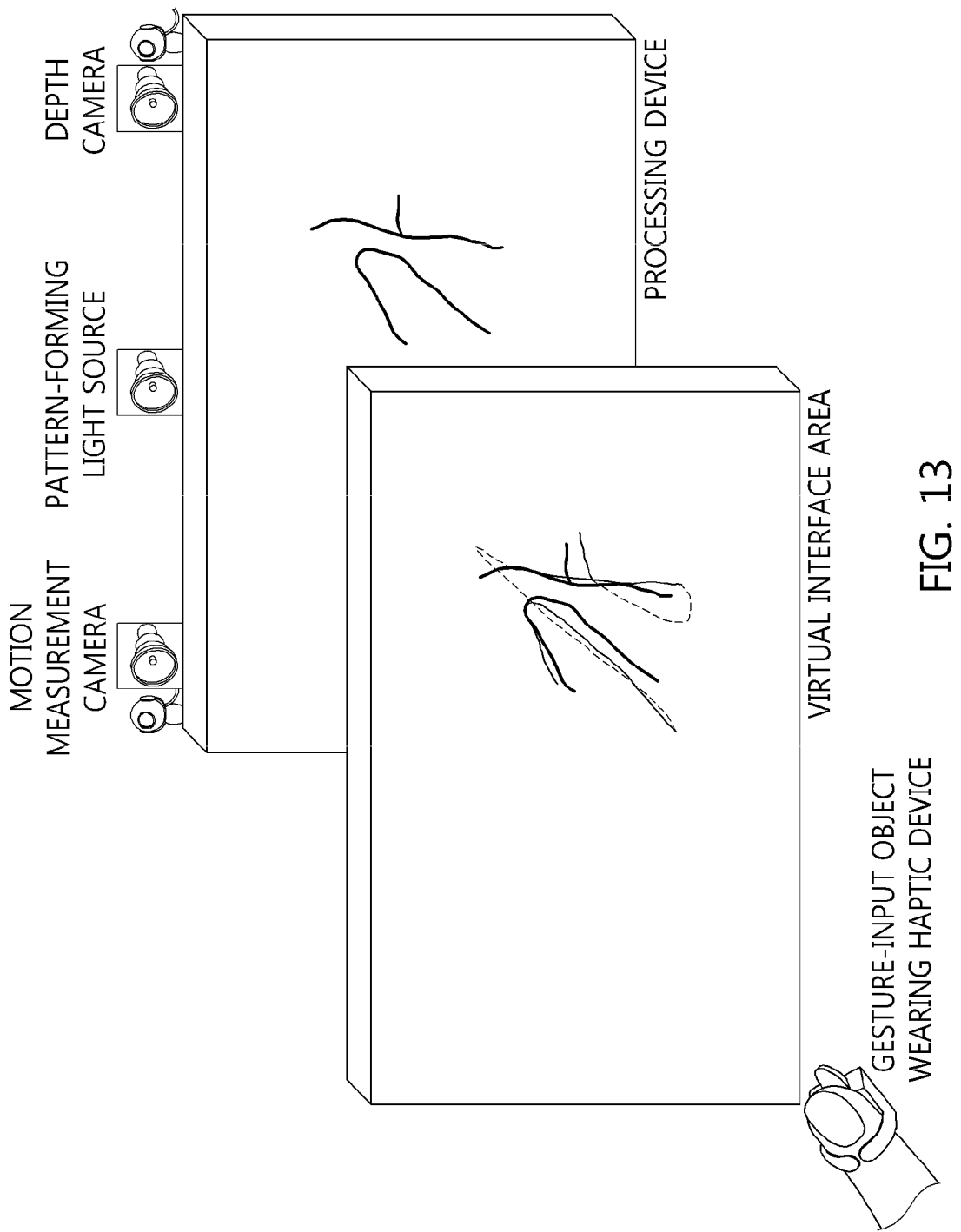
FIG. 13 is a diagram showing an example to which the spatial gesture recognition apparatus according to the embodiment of FIG. 1 is applied.

FIG. 13 illustrates an embodiment to which the above-described spatial gesture recognition apparatus is applied.

In accordance with the present embodiment, the recognition of an object such as a hand in a space may be performed in the virtual interface area which is set to an interface such as a virtual air bounce or a virtual whiteboard.

In this case, the distance in the Z axis direction may be recognized by a ring-type haptic device worn on the user in the interface area such as the virtual air bounce or the virtual whiteboard. The user may accurately convey the meaning of a hand gesture desired to be input by the user to a computing device, based on the feedback information provided via the haptic device depending on the depth recognized by the virtual interface.

In this case, a light source for forming the pattern radiates light, at a predetermined location, onto the object and forms a pattern, and a motion detection camera captures a motion image of the object.

A processing device may analyze the pattern formed on the object from the motion image of the object acquired by the motion detection camera, calculate depth information, transmit the calculated depth information to the haptic device, and allow haptic feedback to be provided to the user. In this case, as shown in the drawing, the spatial gesture recognition apparatus may further include a depth measurement camera, wherein, if the depth of the object is measured by the depth measurement camera, the depth information may be transmitted to the haptic device, or may be used to recognize the gesture of the object. The processing device may include a display means if necessary, and output the recognized gesture via the display means. Alternatively, the results of the recognition may be transmitted to an external display connected in a wired/wireless manner and may then be output via the external display.

The configuration of the spatial gesture recognition apparatus according to the present embodiment may be designed as a small-sized portable device and may be designed as an additional device that can be included in mobile terminals or the like, or as a device that can be installed in a TV or a set-top box, and may then be used. Further, the apparatus according to the present embodiment enables direct feedback to a user, which could not be assigned by conventional game devices (Kinect, etc.), to be provided, thus allowing the user's hand gesture to be precisely recognized. Therefore, the spatial gesture recognition apparatus according to the present embodiment may replace a user motion recognition device for various types of game devices and may be utilized as an interaction device in a 3D space.

Those skilled in the art to which the present embodiments pertain will appreciate that the present invention may be implemented in other detailed forms without changing the technical spirit or essential features of the present invention. Therefore, the above-described embodiments should be understood to be exempla rather than restrictive in all aspects.

The invention claimed is:

1. An apparatus for recognizing a spatial gesture, comprising:

a pattern formation unit for radiating light onto a surface of an object required to input a gesture in a virtual air bounce, and forming a predetermined pattern on the surface of the object;

an image acquisition unit for acquiring a motion image of the object;

a processing unit for recognizing a gesture input by the object based on the pattern formed on the surface of the object using the acquired image;

a gesture recognition unit for recognizing a motion of the object as a gesture, the gesture recognition unit extracts vector values from the gesture and differentiates velocities of the vector values to eliminate or correct a meaningless portion of the gesture;

wherein the gesture recognition unit recognizes the motion of the object made in a predetermined area of the air bounce as a gesture based on the calculated depth information of the object;

wherein the gesture recognition unit extracts information about one or more feature vectors from the recognized gesture, and eliminates a ligature from the motion of the object using the extracted feature vectors;

wherein the gesture recognition unit extracts one or more segmentation points using the extracted feature vectors and the calculated depth information of the object, and determines a portion for connecting the extracted segmentation points to be a ligature; and wherein the gesture recognition unit extracts the segmentation points by applying the feature vectors and the depth information of the object to any one of the following feature point extraction techniques: a matching probability technique and a pattern model technique.

2. The apparatus of claim 1, wherein the processing unit comprises:

a pattern analysis unit for analyzing the pattern formed on the object and calculating depth information of the object entering the air bounce.

3. The apparatus of claim 2, wherein the pattern analysis unit calculates one or more of size information and density information of the pattern formed on the object, and calculates the depth information of the object using the calculated information.

4. The apparatus of claim 1, wherein the differentiated velocities comprise acceleration values.

5. A method of recognizing a spatial gesture, comprising:

radiating light onto a surface of an object required to input a gesture in a virtual air bounce, and forming a predetermined pattern on the surface of the object;

acquiring a motion image of the object;

recognizing a gesture input by the object based on the pattern formed on the surface of the object using the acquired image;

extracting vector values from the gesture input and differentiating velocities of the vector values to eliminate or correct a meaningless portion of the gesture input;

wherein recognizing the gesture comprises:

analyzing the pattern formed on the object and calculating depth information of the object entering the air bounce;

wherein a motion of the object made in a predetermined area of the air bounce is recognized as a gesture based on the calculated depth information of the object;

wherein recognizing the gesture comprises:

eliminating a ligature from the motion of the object using the vector values;

wherein eliminating the ligature comprises:

extracting one or more segmentation points using the vector values and the calculated depth information of the object; and determining a portion for connecting the extracted segmentation points to be the ligature; and wherein extracting the segmentation points is configured to extract the segmentation points by applying the vector values and the depth information of the object to any one of feature point extraction techniques including a matching probability technique and a pattern model technique.

6. The method of claim 5, wherein calculating the depth information is configured to calculate one or more of size information and density information of the pattern formed on the object, and calculate the depth information of the object using the calculated information.

7. The apparatus of claim 5, wherein the differentiating velocities comprise acceleration values.

* * * * *